US006915571B2

(12) United States Patent
Hosono et al.

(10) Patent No.: US 6,915,571 B2
(45) Date of Patent: Jul. 12, 2005

(54) AUTOMOBILE ASSEMBLING SYSTEM AND METHOD OF ASSEMBLING AUTOMOBILES

(75) Inventors: Kouichi Hosono, Mie (JP); Kenichi Matsuo, Mie (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 105 days.

(21) Appl. No.: 10/111,935

(22) PCT Filed: Sep. 12, 2001

(86) PCT No.: PCT/JP01/07901

§ 371 (c)(1), (2), (4) Date: May 1, 2002

(87) PCT Pub. No.: WO02/24514

PCT Pub. Date: Mar. 28, 2002

(65) Prior Publication Data

US 2002/0162209 A1 Nov. 7, 2002

(30) Foreign Application Priority Data

Sep. 21, 2000 (JP) ....................................... 2000-286249

(51) Int. Cl.[7] ................................................ B21D 53/88

(52) U.S. Cl. .......................... 29/897.2; 29/430; 29/783; 29/797; 49/502; 296/146.1

(58) Field of Search ................................ 29/897.2, 429, 29/430, 783, 784, 791, 799, 822, 824; 49/502, 506; 296/146.1, 146.5, 146.7

(56) References Cited

U.S. PATENT DOCUMENTS

| | | | | |
|---|---|---|---|---|
| 4,589,184 A | * | 5/1986 | Asano et al. | 29/430 |
| 4,937,929 A | * | 7/1990 | Nokajima et al. | 29/430 |
| 5,079,822 A | * | 1/1992 | Arai et al. | 29/430 |
| 5,123,148 A | * | 6/1992 | Ikeda et al. | 29/11 |
| 5,203,073 A | * | 4/1993 | Kotake et al. | 29/784 |
| 5,619,784 A | * | 4/1997 | Nishimoto et al. | 29/430 |
| 6,112,878 A | * | 9/2000 | Sato et al. | 198/346.2 |
| 6,202,296 B1 | * | 3/2001 | Tatsuda et al. | 29/784 |
| 6,324,749 B1 | * | 12/2001 | Katsuura et al. | 29/703 |
| 6,421,893 B1 | * | 7/2002 | Katayama et al. | 29/33 K |

FOREIGN PATENT DOCUMENTS

| | | | | |
|---|---|---|---|---|
| GB | 2332412 A | * | 6/1999 | B65G/37/02 |
| JP | 4-201140 | | 7/1992 | |
| JP | 404354632 A | * | 12/1992 | 29/429 |
| JP | 11-179627 | | 7/1999 | |

* cited by examiner

*Primary Examiner*—Jermie E. Cozart
(74) *Attorney, Agent, or Firm*—Sughrue Mion, PLLC

(57) ABSTRACT

An automobile assembly system 1 for assembling plural types of automobiles including a type equipped with a slide door and/or a tailgate, comprising: a front door sub-line 7 for assembling front door assemblies; a rear door sub-line 8 for assembling rear door assemblies or slide door assemblies; a tailgate sub-line 9 for assembling tailgate assemblies; and a main line for assembling the front door assembly, the rear door assembly or the slide door assembly and the tailgate assembly with a vehicle body F.

29 Claims, 7 Drawing Sheets

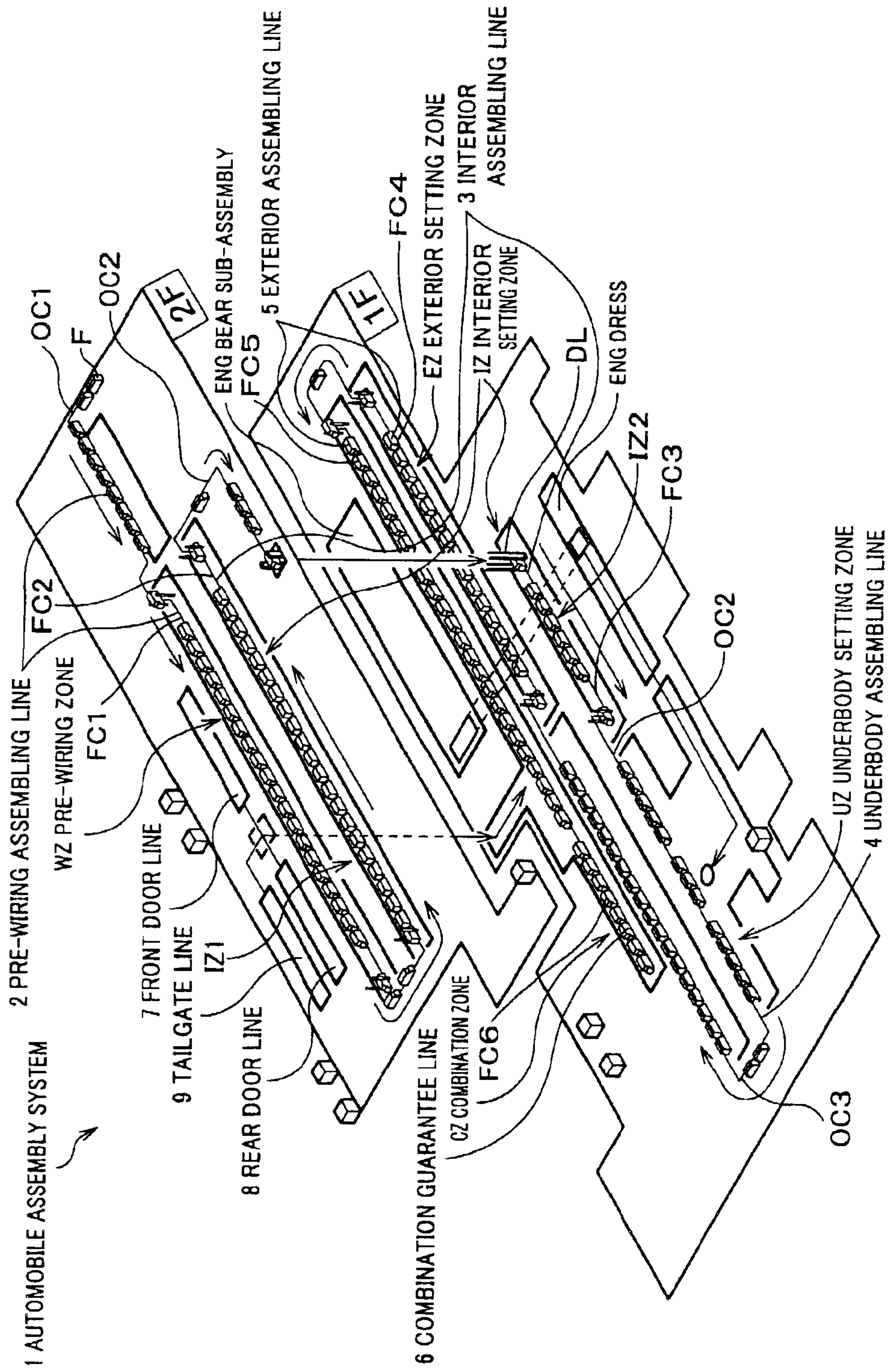
FIG. 1
1 AUTOMOBILE ASSEMBLY SYSTEM
2 PRE-WIRING ASSEMBLING LINE
WZ PRE-WIRING ZONE
FC1
FC2
7 FRONT DOOR LINE
9 TAILGATE LINE
IZ1
8 REAR DOOR LINE
6 COMBINATION GUARANTEE LINE
CZ COMBINATION ZONE
FC6
OC1
F
OC2
2F
ENG BEAR SUB-ASSEMBLY
FC5
5 EXTERIOR ASSEMBLING LINE
1F
FC4
EZ EXTERIOR SETTING ZONE
3 INTERIOR ASSEMBLING LINE
IZ INTERIOR SETTING ZONE
DL
ENG DRESS
IZ2
FC3
OC2
UZ UNDERBODY SETTING ZONE
4 UNDERBODY ASSEMBLING LINE
OC3

2F
1F
TRP
TG
SD
LFD
FC1
RFD
DRP
OC4
OC5
OC6
OC7
OC8
OC9
TFP
TA
SA
LFA
FC5
RFA
DFP
F
2
5
7
70
71
72
73
74
75
8
80
81
82
83
84
85
9
90
91
92
94
95

FIG.3

| TYPE | NUMBER OF PROCESSES<br>(1) REMOVE T/G IN ALL TYPES | <br>(2) REMOVE T/G IN D, E TYPES |
|---|---|---|
| A<br>4 DOORS | R/FR DOOR (12) / R/RR DOOR (9) / T/G (13)<br>L/FR DOOR (12) / L/RR DOOR (9)<br>FR DOOR 24 PRCS. RR DOOR 18 PRCS. T/G 13 PRCS. | R/FR DOOR (12) / R/RR DOOR (9) / T/G MAIN ASS.<br>L/FR DOOR (12) / L/RR DOOR (9)<br>FR DOOR 24 PRCS. RR DOOR 18 PRCS. |
| B<br>3 DOORS | R/FR DOOR (11) / T/G (11)<br>L/FR DOOR (11)<br>FR DOOR 22 PRCS. RR DOOR 0 PRC. T/G 11 PRCS. | R/FR DOOR (11) / T/G MAIN ASS.<br>L/FR DOOR (11)<br>FR DOOR 22 PRCS. RR DOOR 0 PRC. |
| C<br>5 DOORS | R/FR DOOR (11) / R/RR DOOR (9) / T/G (11)<br>L/FR DOOR (11) / L/RR DOOR (9)<br>FR DOOR 22 PRCS. RR DOOR 18 PRCS. T/G 11 PRCS. | R/FR DOOR (11) / R/RR DOOR (9) / T/G MAIN ASS.<br>L/FR DOOR (11) / L/RR DOOR (9)<br>FR DOOR 22 PRCS. RR DOOR 18 PRCS. |
| D<br>L/RR DOOR | R/FR DOOR (13) / T/G (11)<br>L/FR DOOR (13) / L/RR DOOR (11)<br>FR DOOR 26 PRCS. RR DOOR 11 PRCS. T/G 11 PRCS. | R/FR DOOR (13) / T/G (11) / T/G (11)<br>L/FR DOOR (13) / L/RR DOOR (11)<br>FR DOOR 26 PRCS. RR DOOR 22 PRCS. |
| E<br>SLD DOOR | R/FR DOOR (12) / T/G (12)<br>L/FR DOOR (12) / SLD DOOR (10)<br>FR DOOR 24 PRCS. RR DOOR 10 PRCS. T/G 12 PRCS. | R/FR DOOR (12) / T/G (12) / T/G (12)<br>L/FR DOOR (12) / SLD DOOR (10)<br>FR DOOR 24 PRCS. RR DOOR 22 PRCS. |

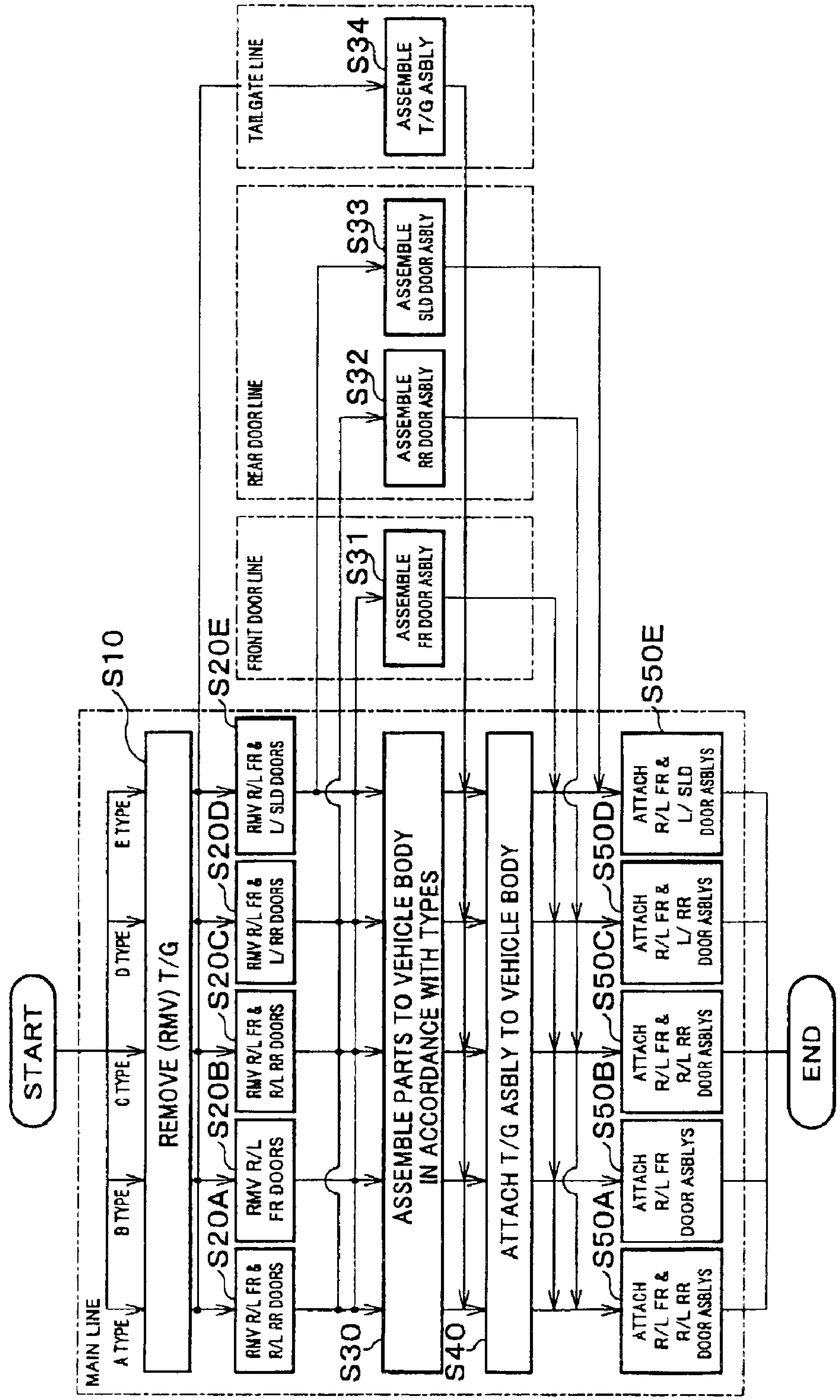
FIG.5
START
MAIN LINE
A TYPE
B TYPE
C TYPE
D TYPE
E TYPE
S10
REMOVE (RMV) T/G
S20A
S20B
S20C
S20D
S20E
RMV R/L FR & R/L RR DOORS
RMV R/L FR DOORS
RMV R/L FR & R/L RR DOORS
RMV R/L FR & L/ RR DOORS
RMV R/L FR & L/ SLD DOORS
S30
ASSEMBLE PARTS TO VEHICLE BODY IN ACCORDANCE WITH TYPES
S40
ATTACH T/G ASBLY TO VEHICLE BODY
S50A
S50B
S50C
S50D
S50E
ATTACH R/L FR & R/L RR DOOR ASBLYS
ATTACH R/L FR DOOR ASBLYS
ATTACH R/L FR & R/L RR DOOR ASBLYS
ATTACH R/L FR & L/ RR DOOR ASBLYS
ATTACH R/L FR & L/ SLD DOOR ASBLYS
END
FRONT DOOR LINE
S31
ASSEMBLE FR DOOR ASBLY
REAR DOOR LINE
S32
ASSEMBLE RR DOOR ASBLY
S33
ASSEMBLE SLD DOOR ASBLY
TAILGATE LINE
S34
ASSEMBLE T/G ASBLY

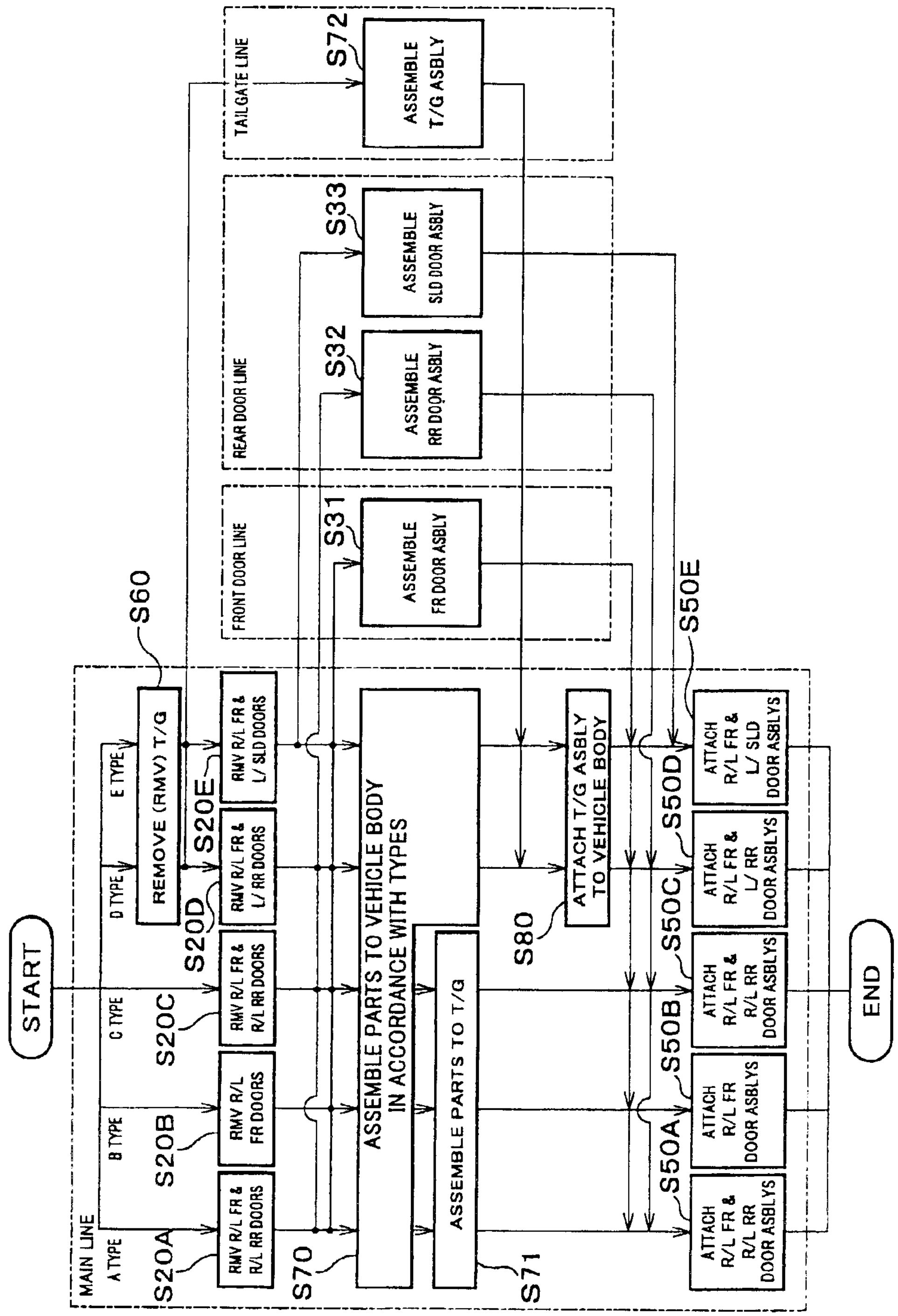
FIG.6
START
MAIN LINE
A TYPE
B TYPE
C TYPE
D TYPE
E TYPE
S60
REMOVE (RMV) T/G
S20A
RMV R/L FR & R/L RR DOORS
S20B
RMV R/L FR DOORS
S20C
RMV R/L FR & R/L RR DOORS
S20D
RMV R/L FR & L/ RR DOORS
S20E
RMV R/L FR & L/ SLD DOORS
S70
ASSEMBLE PARTS TO VEHICLE BODY IN ACCORDANCE WITH TYPES
S71
ASSEMBLE PARTS TO T/G
S80
ATTACH T/G ASBLY TO VEHICLE BODY
FRONT DOOR LINE
S31
ASSEMBLE FR DOOR ASBLY
REAR DOOR LINE
S32
ASSEMBLE RR DOOR ASBLY
S33
ASSEMBLE SLD DOOR ASBLY
TAILGATE LINE
S72
ASSEMBLE T/G ASBLY
S50A
ATTACH R/L FR & R/L RR DOOR ASBLYS
S50B
ATTACH R/L FR DOOR ASBLYS
S50C
ATTACH R/L FR & R/L RR DOOR ASBLYS
S50D
ATTACH R/L FR & L/ RR DOOR ASBLYS
S50E
ATTACH R/L FR & L/ SLD DOOR ASBLYS
END

FIG. 7

| | TYPE | NUMBER OF PROCESSES | | | |
|---|---|---|---|---|---|
| | | SUBLINE | | MAIN LINE | |
| | A / 4 DOORS | R/FR DOOR (12) | R/RR DOOR (9) | | T/G (13) |
| | | L/FR DOOR (12) | L/RR DOOR (9) | | |
| | B / 3 DOORS | R/FR DOOR (11) | | | T/G (11) |
| | | L/FR DOOR (11) | | | |
| | C / 5 DOORS | R/FR DOOR (11) | R/RR DOOR (9) | | T/G (11) |
| | | L/FR DOOR (11) | L/RR DOOR (9) | | |
| | D / L/ RR DOOR | R/FR DOOR (13) | | | T/G (11) |
| | | L/FR DOOR (13) | | L/RR DOOR (11) | |
| | E / SLD DOOR | R/FR DOOR (12) | | | T/G (12) |
| | | L/FR DOOR (12) | | SLD DOOR (10) | |

AUTOMOBILE ASSEMBLING SYSTEM AND METHOD OF ASSEMBLING AUTOMOBILES

FIELD OF THE INVENTION

The present invention relates to an assembly system and an assembly method for assembling plural types of automobiles, and more particularly to an assembly system and an assembly method, which ensures improved assembling efficiency and less space requirement by absorbing man-hour deviations due to different automobile types.

BACKGROUND ART

An automobile assembly system includes a main line for assembling main parts to a vehicle body and a sub-line for assembling assemblies, such as doors, to be assembled with automobiles at the main line. In the main line, plural kinds of conveyors, such as an overhead conveyor and a friction conveyor are used in accordance with the kinds of main parts and assembling area of the vehicle body, and operators or workers are distributed into the corresponding processes. Meanwhile, the sub-line is provided adjacently to the main line. In the sub-line, plural kinds of conveyors are used in accordance with the assemblies, and operators or workers are distributed into the processes.

Generally, in the automobile assembly system, a vehicle body is transferred from a painting system with the doors and the like parts attached to the vehicle body. Accordingly, in consideration of the workability upon assembling various parts, doors and the like parts are removed firstly from the vehicle body carried along the main line. In the automobile assembly system, main parts are assembled to a vehicle body from which doors are removed, while the vehicle body without doors is carried along the main line, and subparts are assembled to the removed doors, while the doors are carried along the sub-line. For example, the sub-line for assembling door assemblies includes two lines, i.e. a conveyor for carrying a front right door and a rear right door with a single hanger, and a conveyor for carrying a front left door and a rear left door with a single hanger. In the case of a four-door vehicle, each hanger carries a front door and a rear door. Meanwhile, in the case of a two-door vehicle, each hanger carries a front door. In the automobile assembly system, the door assembly assembled in the sub-line is finally attached to the vehicle body in the main line.

In recent years, production of automobiles has been changed on demand of the user from "small types large-scale production" to "large types small-scale production", and in the automobile assembly system, an assembly system is constituted such that a large number of types are assembled in the same single assembly line. Because the assembly method, the equipment, the specification, the number of parts and the like differ if the type of the vehicle is different, the number of processes for assembling the automobile is different for each type. For this reason, in the automobile assembly system applicable for many different kinds, the assembly line is constituted according to the automobile assembly method selected from many different kinds and with the maximum number of assembling processes, so as to enable assembly of all kinds of automobiles. Of course, if the automobile assembly system includes the main line and the sub-line, the sub-line is also constituted according to the automobile assembly method with the maximum number of assembling processes.

However, the automobile is classified from a small-sized vehicle to a large-sized vehicle, and the number of processes is considerably large in the type with the maximum number of processes, when compared with the type with the minimum number of processes. Therefore, in the automobile assembly system associated with plural kinds of types, the main line is constituted in accordance with the assembling processes of the type with the maximum number of assembling processes. As a result, the length of the line becomes longer and the number of operators distributed into each process increases. Therefore, when assembling the type with the minimum assembling processes in this automobile assembly system, operations are not performed in a large number of processes of the main line, leading to an excess of operators. In other words, when assembling various types of automobiles, man-hour deviations arise due to different types (car model). This leads to deteriorated assembling efficiency and increased space requirement of the whole system.

Further, the same car model includes various types, such as sedan, coupe and wagon, and the number of assembling parts or processes is different in each type. For example, with respect to the door, various types exist such as a two-door type vehicle, a four-door type vehicle and a rear slide-door type vehicle, and there also exists a type equipped with a tailgate. For example, FIG. 7 illustrates the number of assembling processes (for five different types) for assembling doors in a conventional automobile assembly system, in which A type has four doors (right and left front doors and right and left rear doors) and a tailgate, B type has three doors (right and left front doors and a tailgate), C type has five doors (right and left front doors, right and left rear doors and a tailgate), D type has right and left front doors, a left rear door and a tail gate, and E type has right and left front doors, a left slide door and a tailgate. Therefore, in the automobile assembly system associated with the above five different types, the sub-line for assembling door assemblies is constituted in accordance with the assembling processes (42 processes) of A type, which is the maximum number of processes, and operators are distributed into each process. The capacity of this sub-line is the maximum of 42 processes as the assembling capacity for assembling front door assemblies and rear door assemblies. However, since B type does not have right and left rear doors, D type has an exceptional left rear door, and E type has a slide door, these doors are not assembled as an assembly in the sub-line but are assembled as an assembly in the main line. For this reason, in the sub-line, an excess of processes arises for the processes for assembling the rear door assemblies, leading to a large number of excess operators distributed into these processes. Further, since the exceptional left rear door, the slide door and the tailgate are assembled as an assembly in the main line, the length of the main line becomes longer for the processes of assembling the slide door, the tailgate and the like, and the operators are distributed into each operation. In other words, since the number of doors or the number of processes for assembling each door assembly is different, man-hour deviations arise between each of the types. Further, in the case of multitypes, the type with a slide door and/or a tailgate should be taken into consideration, thereby leading to the increased number of assembling processes in the main line. As a result, the assembling efficiency is decreased and the whole system becomes larger in space requirement.

DISCLOSURE OF THE INVENTION

In view of the above, the present invention seeks to provide an automobile assembly system and a method of assembling automobiles, in which the assembling efficiency is improved by way of absorbing the man-hour deviations due to different types of automobiles and the space-saving requirement is achieved.

In order to eliminate the foregoing drawbacks of the prior art, the present invention seeks to provide an automobile assembly system for assembling plural types of automobiles including a type equipped with a slide door and/or a tailgate, comprising: a front door sub-line for assembling front door assemblies; a rear door sub-line for assembling rear door assemblies or slide door assemblies; and a main line for assembling the front door assembly with a vehicle body and for assembling the rear door assembly or the slide door assembly with a vehicle body.

With such an automobile assembly system, since in the rear door sub-line, slide door assemblies can be assembled other than rear assemblies, it is not necessary to assemble slide door assemblies in the main line. Therefore, the length of the main line can be reduced, and man-hour deviations can be absorbed between types equipped with a slide door or a rear door.

Further, in the above automobile assembly system, the automobile assembly system may further comprise a tailgate sub-line for assembling tailgate assemblies, and the tailgate assembly is assembled with a vehicle body in the main line.

According to this automobile assembly system, because of the provision of the tailgate sub-line, it is not necessary to assemble tailgates in the main line. Therefore, the length of the main line can be reduced.

Further, in the above automobile assembly system, excess man-hours at the main line or at the rear door sub-line may be distributed to man-hours required for assembling the tailgate assemblies.

According to this automobile assembly system, tailgate assemblies are assembled by way of utilizing man-hour deviations derived from differences of the types and arisen at the main line or at the sub-line. In other words, since the main line and the sub-line are constituted in accordance with the assembling processes of the type with the maximum number of assembling processes, excess operators arise when assembling a type with a small number of assembling processes. Therefore, the excess operators at the main line or at the rear door sub-line assemble tailgate assemblies. As a result, man-hour deviations derived from differences of the types are absorbed, and the assembling efficiency is improved.

Also, the present invention seeks to provide a method of assembling plural types of automobiles including a type equipped with a slide door and/or a tailgate, comprising: a front door assembling step for assembling front door assemblies in a front door sub-line; a rear door assembling step for assembling rear door assemblies or slide door assemblies in a rear door sub-line in the case of a type equipped with a rear door or a slide door; and a door fixing step for assembling the front door assembly with a vehicle body in the main line, and in the case of a type equipped with a rear door or a slide door, for assembling the rear door assembly or the slide door assembly with a vehicle body in the main line.

With such an automobile assembly method, since rear door assemblies or slide door assemblies are assembled in the rear door assembling step that is carried out in the same rear door sub-line, man-hour deviations between the types equipped with a slide door or a rear door are absorbed, and the length of the main line can be reduced.

Further, in the above automobile assembly method, in the case of a type equipped with a tailgate, the method may further comprise: a tailgate assembling step for assembling tailgate assemblies in a tailgate sub-line; and a tailgate fixing step for assembling the tailgate assembly with a vehicle body in the main line.

According to this automobile assembly method, since tailgates are assembled in the tailgate assembling step in the tailgate sub-line, the length of the main line can be reduced.

Further, in the above automobile assembly method, excess man-hours at the main line or at the rear door sub-line may be distributed to man-hours required for assembling the tailgate assemblies.

According to this automobile assembly method, tailgate assemblies are assembled by way of utilizing man-hour deviations derived from differences of the types and arisen at the main line or at the sub-line. In other words, since the main line and the sub-line are constituted in accordance with the assembling processes of the type with the maximum number of assembling processes, excess operators arise when assembling a type with a small number of assembling processes. Therefore, the excess operators at the main line or at the rear door sub-line assemble tailgate assemblies. As a result, man-hour deviations derived from differences of the types are absorbed, and the assembling efficiency is improved.

Herein, the term "rear door" refers to a door provided at a rear side of the automobile and opened outwardly of the vehicle body, and the term "slide door" refers to a door opened along the vehicle body and slidable toward a rear side of the automobile.

BRIEF DESCRIPTION OF THE DRAWINGS

FIG. 1 shows an overall arrangement of an automobile assembly system according to the present invention.

FIG. 3 shows a table illustrating the number of processes with respect to doors of the types (five types) assembled in the automobile assembly system according to the present invention.

FIG. 5 is a flow chart of the automobile assembly method according to the present invention (in an instance where the tailgate is removed in all of the five different types).

FIG. 6 is a flow chart of the automobile assembly method according to the present invention (in an instance where the tailgate is removed in only D type and E type out of five different types).

FIG. 7 shows a table illustrating the number of processes with respect to doors of the type (five types) assemblies assembled in a conventional automobile assembly system.

BEST MODE FOR CARRYING OUT THE INVENTION

Figure 2:
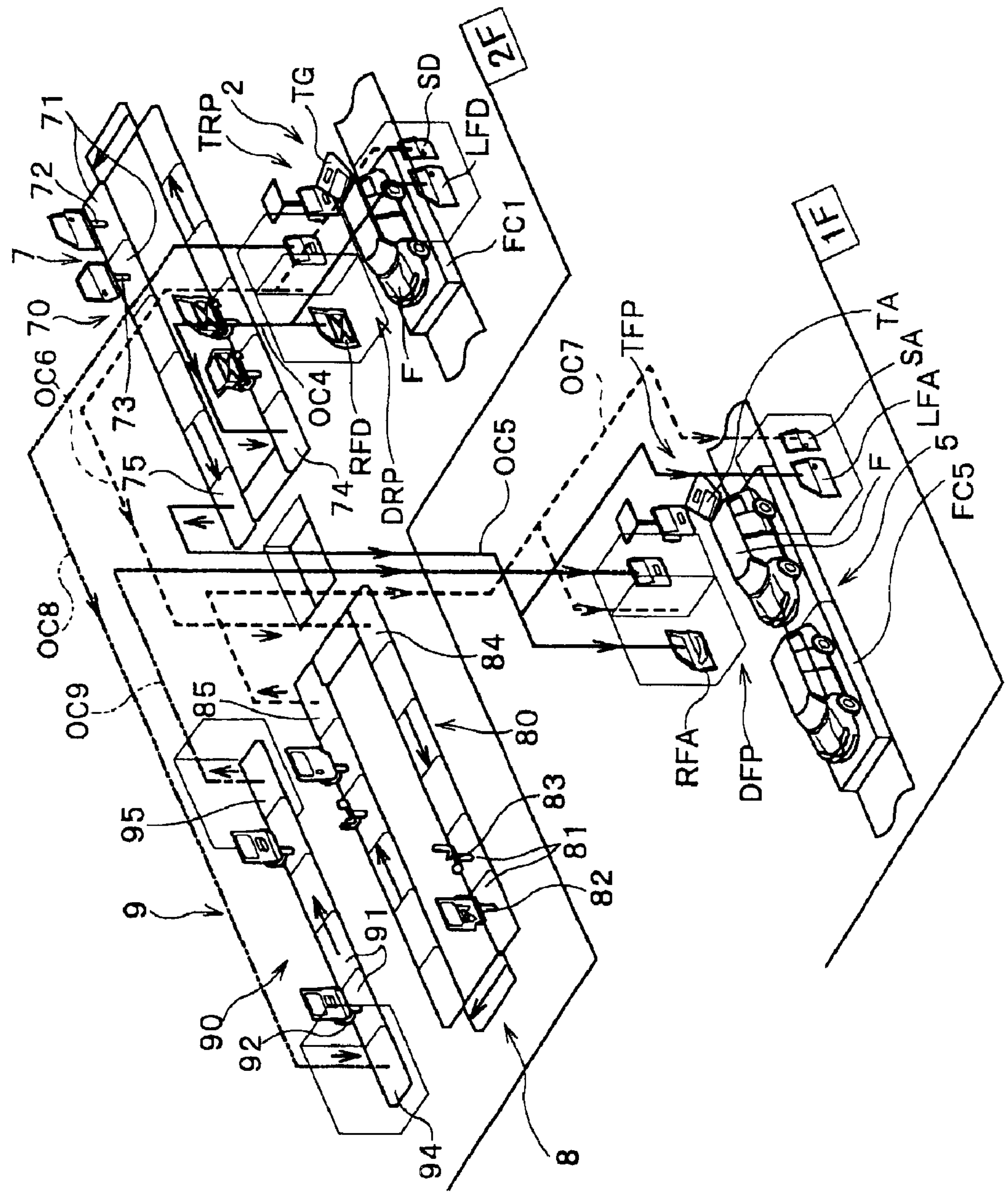
FIG. 2 shows a constitution of a front door line, rear door line and a tailgate line according to the present invention.

With reference to the accompanied drawings, preferred embodiments of an automobile assembly system and an automobile assembly method according to the present invention will now be described.

According to the automobile assembly system and the automobile assembly method regarding the present invention, there is provided a front door sub-line, a rear door sub-line and a tailgate sub-line as sub-lines for doors, and in the case of a type equipped with a slide door, slide door assemblies can be assembled in the rear door sub-line, and in the case of a type equipped with a tailgate, tailgate assemblies can be assembled in the tailgate sub-line. Further, according to the automobile assembly system and the automobile assembly method, operators are not specially allocated to the processes required for assembling tailgate assemblies. Tailgate assemblies can be assembled with the use of the excess operators at the main line or at the rear door sub-line.

The automobile assembly system in this embodiment is divided into five assembling zones at which certain functional elements are intensively incorporated. These five assembling zones are a pre-wiring zone, an interior setting zone, an underbody setting zone, an exterior setting zone and a combination zone. As main lines, each zone is provided with a pre-wiring assembling line, an interior assembling line, an underbody assembling line, an exterior assembling line and a combination guarantee line. Further, sub-lines are positioned adjacent to the main line for assembling various assemblies. In this automobile assembly system, a front door line (front door sub-line) and a rear door line (rear door sub-line) are arranged along the outside of the pre-wiring assembling line, and a tailgate line (tailgate sub-line) is arranged along the outside of the front door line. According to this embodiment, five types that are A type, B type, C type, D type and E type, are assembled in the automobile assembling system. As to doors equipped with these five types, A type has four doors (right and left front doors and right and left rear doors) and a tailgate, B type has three doors (right and left front doors and a tailgate), C type has five doors (right and left front door, right and left rear doors and a tailgate), D type has right and left front doors, a left rear door and a tailgate, E type has right and left front doors, a left slide door and a tailgate. In this embodiment, explanations are made to particular instances, (1) where the tailgate is removed in all of the five types, and the tailgate is assembled as an assembly in the sub-line, and (2) where the tailgate is removed only in D type and E type, the tailgate of D type and E type is assembled as an assembly in the sub-line (that is the tailgate of A type through C type is assembled as an assembly in the main line).

With reference to FIG. 1, the overall arrangement of the automobile assembly system will be described.

The automobile assembly system 1 is divided into a plurality of assembling zones in consideration of collecting a various kinds of parts to be assembled into a vehicle body F as an integration of parts at an assembling area (for example, interior, exterior and underbody) and as an integration of constituting parts for constituting each of the integration of parts per single function. In other words, parts are assembled in the automobile assembly system 1 based on each function of the automobile and by classifying each function. Therefore, each assembling zone has concentrated elemental works associated with each function of the automobile. Conditions for dividing the assembling zones are variable, for example by car model.

The automobile assembly system 1 in the illustrated embodiment refers to as the automobile assembly system defined in the claims.

The automobile assembly system 1 is divided into a pre-wiring zone WZ, an interior setting zone IZ, an underbody setting zone UZ, an exterior setting zone EZ and a combination zone CZ. As main lines in each zone, the automobile assembly system 1 further comprises a pre-wiring assembling line 2, an interior assembling line 3, an underbody assembling line 4, an exterior assembling line 5 and a combination guarantee line 6. Further, the automobile assembly system 1 comprises sub-lines, such as a front door line 7 and an ENG-bear subassembly line at a side of the main lines 2, 3, 4, 5 and 6. Further, in the automobile assembly system 1, the lines are arranged extending from the first floor to the second floor. In the automobile assembly system 1, assembling operations firstly start at the pre-wiring zone WZ on the second floor, and subsequently to assembling at the upstream part IZ1 of the interior setting zone IZ. And in the automobile assembly system 1 at an intermediate of the interior setting zone IZ, a transferred vehicle body F is lowered with a drop lifter DL from the second floor to the first floor. Further, in the automobile assembly system 1, the vehicle body F is carried and assembled on the first floor in the order of the downstream part IZ2 of the interior setting zone IZ, the underbody setting zone UZ, the exterior setting zone EZ and the combination zone CZ.

The pre-wiring assembling line 2, the interior assembling line 3, the underbody assembling line 4, the exterior assembling line 5 and the combination guarantee line 6 illustrated in this embodiment refers to as the main line defined in the claims.

Further, in the automobile assembly system 1, in order to reduce the length of the main line and to decrease man-hour deviations due to differences of the types, front doors, rear doors or a slide door and a tailgate are removed from the vehicle body F, and each assembly is assembled in the sub-line. To this end, the automobile assembly system 1 comprises a front door line 7 for assembling right and left front door assemblies, a rear door line 8 for assembling right and left rear doors and right and left slide doors, and a tailgate line 9 for assembling tailgates.

Further, the front door line 7, the rear door line 8 and the tailgate line 9 illustrated in this embodiment refer to as the front door sub-line, the rear door sub-line and the tailgate sub-line, respectively, defined in the claims.

The pre-wiring zone WZ is a zone where electric wires of the vehicle, in-car LAN cables and pipes are integrated and assembled to a vehicle body F. For this purpose, the pre-wiring zone WZ is provided with the pre-wiring assembling line 2 as a main line. In the pre-wiring line 2, vehicle bodies are carried with an overhead conveyor OC1 at the upstream part and with a friction conveyor at the downstream part, and various parts are assembled to a vehicle body F while carrying the vehicle body F along these conveyors. Further, because assembly of various parts with respect to the vehicle body F is initiated at the pre-wiring zone WZ, front doors, rear doors or a slide door and a tailgate are removed from the vehicle body F at the upstream part of the friction conveyor FC1 in order to improve assembling workability at the downstream part. And, the removed front doors, rear doors or slide door and tailgate are transferred to the front door line 7, the rear door line 8 and the tailgate line 9 positioned outwardly and along the friction conveyor FC1 and are assembled into each assembly in the respective lines 7, 8 and 9.

The interior setting zone IZ is a zone where interior parts or floor parts of the automobile are integrated and assembled to the vehicle body F, and for example, an instrument panel, pedals, floor mats, linings and seat belts are assembled to the vehicle body F. For this purpose, the interior setting zone IZ is provided with the interior assembling line 3. In the interior assembling line 3, parts are assembled to a vehicle body F while the vehicle body F is carried on the second floor and the first floor along the friction conveyors FC2, FC3.

Further, at the interior setting zone IZ, in order to transfer the vehicle body F from the second floor to the first floor, the vehicle body F is moved from the friction conveyor FC2 to the overhead conveyor OC2. And, the vehicle body F is moved from the overhead conveyor OC2 to the friction conveyor FC3 with the drop lifter DL arranged between the downstream of the overhead conveyor OC2 on the second floor and the upstream of the friction conveyor FC3 on the first floor.

The underbody setting zone UZ is a zone where underbody parts of the automobile are integrated and assembled to a vehicle body F, and suspensions, an engine, tires and the like are assembled to the vehicle body F. For this purpose, the underbody setting zone UZ is provided with the underbody assembling line 4. In the underbody assembling line 4, parts are assembled to a vehicle body F while carrying the vehicle body F along the overhead conveyor OC3.

The exterior setting zone EZ is a zone where exterior parts of the automobile are integrated and assembled to a vehicle body F, and a windshield, seats, bumpers, doors and the like are assembled to a vehicle body F. For this purpose, the exterior setting zone EZ is provided with the exterior assembling line 5. In the exterior assembling line 5, parts are assembled to a vehicle body F while carrying the vehicle body F along the friction conveyors FC4 and FC5. Further, because assembly of various parts with respect to the vehicle body F is completed at the exterior setting zone EZ, front door assemblies, rear door assemblies or a slide door assembly and a tailgate assembly are attached to the vehicle body F at the downstream part of the friction conveyor FC5. Therefore, front door assemblies, rear door assemblies or slide door assemblies and tailgate assemblies each assembled in the respective lines 7, 8 and 9 are lifted down from the second floor to the first floor and are carried to the downstream part of the friction conveyor FC5.

The combination zone CZ is a zone where inspection of the function is carried out for various parts or equipment assembled to the vehicle body F at the upstream assembling zones, and for example, confirming the switch-on of the light, wire connecting of the battery and terminals are carried out. For this purpose, the combination zone CZ is provided with the combination guarantee line 6. In the combination guarantee line 6, various inspections are carried out for the vehicle body which is carried with the friction conveyor FC6.

Figure 4:
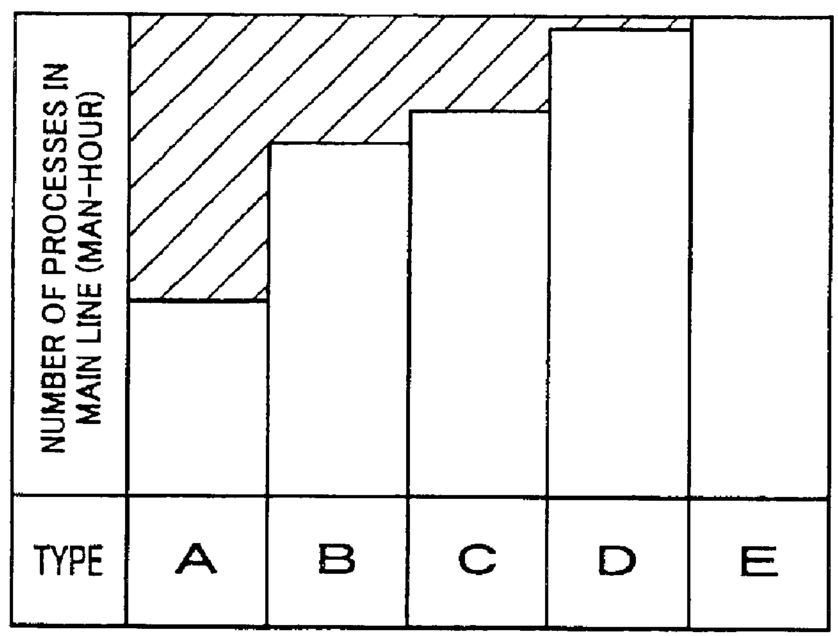
FIG. 4 is a graph illustrating the number of processes in the main line with respect to the types (five types) assembled in the automobile assembly system according to the present invention.

By the way, each assembling line (main line) 2, 3, 4, 5 and 6 is divided into a large number of processes, and one or more operators or workers are allocated to each process. In the automobile assembly system 1, in order to ensure assembly of a plurality of types, each assembling line 2, 3, 4, 5 and 6 is constituted associated with the assembling processes of the type with the maximum number of processes among all the types to be assembled. FIG. 4 illustrates the number of processes at the main line associated with five different types, in which E type has the maximum number of processes. In this event, each line (main line) 2, 3, 4, 5 and 6 of the automobile assembly system 1 is constituted in accordance with the assembling processes of E type.

Sub-lines such as the front door sub-line 7 and the like are also divided into a large number of processes, and one or more operators are allocated to each process. By the way, in order to absorb man-hour deviations due to differences of the types, operators are not specially allocated for some sub-lines. Further, in the automobile assembly system 1, in order to ensure assembly of a plurality of types, each sub-line is also constituted associated with the assembling processes of the type with the maximum number of processes among all the types to be assembled. For example, FIG. 3 illustrates the number of processes with respect to door assemblies of five types assembled in the automobile assembly system 1. Consideration is made to an instance where (1) tailgates of all the types are removed. In this instance, the number of processes of D type (26 processes) is the maximum as to assembly of the front door assembly, and the number of processes of A type and C type (18 processes) is the maximum as to assembly of the rear door assembly, and the number of processes of A type (13 processes) is the maximum as to assembly of the tailgate assembly. Therefore, the front door line 7 is constituted in accordance with the assembling processes of D type, the rear door line 8 is constituted in accordance with the assembling processes of A type and C type, and the tailgate line 9 is constituted in accordance with the assembling processes of A type.

Next, with reference to FIGS. 1 and 2, the constitution of the sub-line for assembling door assemblies will be described. The vehicle body F shown in FIG. 2 is E type, in which a slide door is equipped at the rear of the vehicle body.

According to the automobile assembly system 1, not only front door assemblies and rear door assemblies, but also slide door assemblies and tailgate assemblies are assembled in sub-lines. To this end, the automobile assembly system 1 is provided with the front door line 7, the rear door line 8 and the tailgate line 9. As shown in FIG. 2, in the automobile assembly system 1, a tailgate-removing process TRP for removing tailgates is carried out at the upstream of the friction conveyor FC1, and at the downstream of the tailgate removing process TRP, a door-removing process DRP for removing all the doors (including slide doors) is carried out. Further, in the automobile assembly system 1, a tailgate-fixing process TFP for fixing tailgates is carried out at the downstream of the friction conveyor FC5, and at the downstream of the tailgate-fixing process TFP, a door-fixing process DFP for fixing all the doors (including slide doors) is carried out.

Firstly, the front door line will be described below.

In the front door line 7, various subparts are assembled to the front doors RFD, LFD that are removed at the pre-wiring zone WZ, thereby providing front door assemblies RFA, LFA (see FIG. 2). As to the front doors, all the types have right and left front doors. Therefore, in the front door line 7, the front door assemblies RFA, LFA are always assembled with respect to one vehicle body F. Incidentally, assembly at the front door line 7 is synchronized with assemblies at the assembling lines (main lines) 2, 3, 4 and 5. Specifically, the front doors RFD, LFD are removed from the vehicle body F in the door-removing process DRP, and main parts are assembled to the vehicle body F in the assembling lines (main lines) 2, 3, 4 and 5, and thereafter the vehicle body F is carried to the door-fixing process DFP. Then, the front door assemblies RFA, LFA assembled in the front door line 7 are then carried to the door-fixing process DFP in such a manner as to synchronize with the transfer of the vehicle body F to the door-fixing process DFP.

The front door line 7 is positioned outwardly of and along with the friction conveyor FC1 and is provided with a friction conveyor 70. The friction conveyor 70 is positioned in such a way that a large number of pallets 71 circulate along the guide rails (not shown) with the front end of one pallet 71 contacting to the rear end of another. Each pallet 71 supports thereon a front door LFD (or RFD). Each pallet 71 is provided with a left front door supporting portion 72 or a right front door supporting portion 73 on the top surface thereof, and the front door supporting portion 72, 73 supports the bottom surface and the side surface of the front door RFD, LFD. Besides, the pallet 71 is equipped with four wheels (not shown) on the bottom surface of the pallet 71 at the front and the rear and at the right and the left, respectively, so that the wheels engage with the guide rails.

And, in the front door line 7, in order to assemble right front door assemblies RFD and left front door assemblies LFD, front doors RFD, LFD for one vehicle body F are carried with two front and rear pallets 71. The left front door supporting portion 72 for supporting a left front door LFD and the right front door supporting portion 73 for supporting a right front door RFD are alternately arranged on the pallets 71. The front door supporting portion 72, 73 has a mechanism for supporting all the types of the front doors RFD, LFD. Further, in order to improve workability, the front door supporting portion 72, 73 may have a lifting mechanism with respect to the front door RFD, LFD for adjusting the height of operations.

In the front door line 7, door glasses, door mirrors, door lock assemblies, door linings and the like are assembled to a vehicle body F, while transferring front doors RFD, LFD on the friction conveyor 70. Incidentally, the front door line 7 is arranged associated with the assembling processes of the type, among the five types, with the maximum number of necessary processes for assembling front door assemblies.

Further, an overhead conveyor OC4 is arranged between a front door receiving position 74 of the front door line 7 and the door-removing process DRP, and the front door RFD, LFD is carried with the overhead conveyor OC4 from the door-removing process DRP to the front door receiving position 74. Likewise, an overhead conveyor OC5 is arranged between a front door assembly transferring position 75 of the front door line 7 and the door-fixing process DFP, and the front door assembly RFA, LFA is carried with the overhead conveyor OC5 from the front door assembly transferring position 75 to the door-fixing process DFP.

Next, the rear door line 8 will be described below.

The rear door line 8 is a line where various subparts are assembled to a rear door or a slide door SD, which is removed from a vehicle body F at the pre-wiring zone WZ, to thereby providing a rear door assembly or a slide door assembly SA (see FIG. 2). By the way, rear doors are variable in accordance with the types, and for example, there exist a type equipped with a door at both right and left sides of the automobile, a type equipped with a door only at the left side of the automobile, a type equipped with a left slide door, and a type without doors (or a type not classified into the five types in this embodiment). For this reason, in the rear door line 8 there are some instances, where both right and left rear door assemblies are assembled, where only left rear door assemblies are assembled, where left slide door assemblies SA are assembled, and where door assemblies are not assembled. Further, assembly in the rear door line 8 is synchronized with the assemblies in the assembling lines (main lines) 2, 3, 4 and 5. Specifically, the rear doors or the slide door SD are removed from the vehicle body F in the door-removing process DRP, and main parts are assembled to the vehicle body F in the assembling lines (main lines) 2, 3, 4 and 5, and thereafter the vehicle body F is carried to the door-fixing process DFP. The rear door assemblies or the slide doors SA assembled in the rear door line 8 are then carried to the door-fixing process DFP in such a manner as to synchronize with the transfer of the vehicle body F to the door-fixing process DFP.

The rear door line 8 is positioned outwardly of and along with the friction conveyor FC1 and is provided with a friction conveyor 80. The friction conveyor 80 is positioned in such a manner that a large number of pallets 81 circulate along the guide rails (not shown) with the front end of one pallet 81 contacting to the rear end of another. Each pallet 81 supports thereon a rear door or a slide door SD. Each pallet 81 is provided with a left rear door supporting portion 82 or a right rear door supporting portion 83 on the top surface thereof, and the rear door supporting portion 82, 83 supports the bottom surface and the side surface of the rear door or the slide door SD. Further, each pallet 81 is equipped with four wheels (not shown) on the bottom surface of the pallet 81 at the front and the rear and at the right and the left, respectively, so that the wheels engage with the guide rails.

Moreover, in the rear door line 8, in order to assemble right rear door assemblies and left rear door assemblies or slide door assemblies, right and left rear doors or a slide door SD for one vehicle body F are carried with two front and rear pallets 81. Therefore, the left rear door supporting portion 82 for supporting a left rear door or a left slide door SD and the right rear door supporting portion 83 for supporting a right rear door or a right slide door are alternately arranged on the pallets 81. The rear door supporting portions 82, 83 have a mechanism for supporting all the types of the rear doors and the slide doors. Further, in order to improve workability, the rear door supporting portions 82, 83 may have a lifting mechanism with respect to the rear door or the slide door SD for adjusting the height of operations.

In the rear door line 8, door glasses, door lock assemblies, door linings and the like are assembled to a vehicle body F, while transferring rear doors or slide doors SD on the friction conveyor 80. The rear door line 8 is arranged associated with the assembling processes of the type, among the five types, with the maximum number of necessary processes for assembling rear door assemblies or slide door assemblies SA.

An overhead conveyor OC6 is arranged between a rear door receiving position 84 of the rear door line 8 and the door-removing process DRP, and the rear door or the slide door SD is carried with the overhead conveyor OC6 from the door-removing process DRP to the door receiving position 84. Likewise, an overhead conveyor OC7 is arranged between a rear door assembly transferring position 85 of the rear door line 8 and the door-fixing process DFP, and the rear door assembly or the slide door assembly SA is carried with the overhead conveyor OC7 from the rear door assembly transferring position 85 to the door-fixing process DFP.

Next, the tailgate line 9 will be described below.

The tailgate line 9 is a line where various subparts are assembled to a tailgate TG, which is removed from a vehicle body F at the pre-wiring zone WZ, to thereby providing a tailgate assembly TA (see FIG. 2). By the way, a tailgate may not be provided for some types (however, in this embodiment, all of the five types are equipped with a tailgate). For this reason, there are instances where tailgate assemblies TA are assembled in the tailgate line 9 and where tailgate assemblies TA are not assembled in the tailgate line 9. Further, in the instance where tailgate assemblies TA are not assembled in the tailgate line 9, there are instances where none of the types has a tailgate TG and where a tailgate TG is equipped, however, the tailgate TG is not removed from a vehicle body F and is assembled in any one of the assembling lines (main lines) 2, 3, 4 and 5. Further, assembly in the tailgate line 9 is synchronized with the assemblies in the assembling lines (main lines) 2, 3, 4 and 5. Specifically, the tailgate TG is removed from the vehicle body F in the tailgate-removing process TRP, and main parts are assembled to the vehicle body F in the assembling lines (main lines) 2, 3, 4 and 5, and thereafter the vehicle body F is carried to the tailgate-fixing process TFP. The tailgate assembly TA assembled in the tailgate line 9 is then carried to the tailgate-fixing process TFP in such a manner as to synchronize with the transfer of the vehicle body F to the tailgate-fixing process TFP.

The tailgate line 9 is positioned outwardly of and along with the friction conveyor 80 and is provided with a friction conveyor 90. The friction conveyor 90 is positioned in such a manner that a large number of pallets 91 are stood in a straight line and the tailgate TG is supported on each pallet 91 and circulate along the guide rails (not shown) with the front end of one pallet 91 contacting to the rear end of another. Each pallet 91 is provided with a tailgate supporting portion 92 on the top surface thereof, and the tailgate supporting portion 92 supports the bottom surface and the side surface of the tailgate TG. And, the pallet 91 is equipped with four wheels (not shown) on the bottom surface of the pallet 91 at the front and the rear and at the right and the left, respectively, so that the wheels engage with the guide rails.

The tailgate supporting portion 92 has a mechanism for supporting all the types of the tailgates TG. Further, in order to improve workability, the tailgate supporting portion 92 may have a lifting mechanism with respect to the tailgate TG for adjusting the height of operations.

In the tailgate line 9, a rear glass, a tailgate lining and the like are assembled to a vehicle body F, while transferring tailgates TG on the friction conveyor 90. Incidentally, the tailgate line 9 is arranged associated with the assembling processes of the type, among the five types, with the maximum number of necessary processes for assembling tailgate assemblies TA.

Further, an overhead conveyor OC8 is arranged between a tailgate receiving position 94 of the tailgate line 9 and the tailgate-removing process TRP, and the tailgate TG is carried with the overhead conveyor OC8 from the tailgate-removing process TRP to the tailgate receiving position 94. Likewise, an overhead conveyor OC9 is arranged between a tailgate assembly transferring position 95 of the tailgate line 9 and the tailgate-fixing process TFP, and the tailgate assembly TA is carried with the overhead conveyor OC9 from the tailgate assembly transferring position 95 to the tailgate-fixing process TFP.

With reference to FIGS. 2 to 4, the arrangement of the processes in the front door line 7, the rear door line 8 and the tailgate line 9 will be described. As mentioned above, there are two instances in this embodiment, (1) where the tailgate is removed in all of the five types (that is, tailgate assemblies are assembled in the tailgate line 9 for all of the five types), and (2) where the tailgate is removed only in D type and E type (that is, tailgate assemblies of D type and E type are assembled in the tailgate line 9, while tailgate assemblies of A, B and C types are assembled in the assembling lines (main lines) 2, 3, 4 and 5). The arrangement of the processes is carried out for the instances (1) and (2), respectively. As a basic concept for the arrangement of the processes, in order to be applicable to all of the five types, the arrangement is made so as to associate with the assembling processes of the type, among all the types assembled in the automobile assembly system 1, with the maximum number of processes.

The instance (1) where the tailgate is removed in all of the five types will be described.

In the process arrangement of the front door line 7, comparison is made for each number of processes for assembling both right and left front door assemblies of A type through E type. As the result of the comparison, D type has 26 processes that is the maximum number of processes (see FIG. 3). The front door line 7 is therefore arranged associated with the assembling processes of D type, and operators or workers are allocated to the respective processes. Further, since operations are different in the respective processes, each operational work is set in accordance with the type. Therefore, in the front door line 7, all the right and left front door assemblies equipped in A type through E type can be assembled.

In the process arrangement of the rear door line 8, comparison is made for each number of processes for assembling both right and left rear door assemblies of A type through E type. Incidentally, in the type (E type) having a slide door at the rear side, comparison is made for the number of processes for assembling a slide door assembly. As the result of the comparison, A type and C type have 18 processes that is the maximum number of processes (see FIG. 3). The rear door line 8 is therefore arranged associated with the assembling processes of A type and C type, and operators or workers are allocated to the respective processes. Since operations are different in the respective processes, each operational work is set in accordance with the type. Therefore, in the rear door line 8, all the right and left rear door assemblies or a slide door assembly equipped in A type through E type can be assembled.

In the process arrangement of the tailgate line 9, comparison is made for each number of processes for assembling a tailgate assembly of A type through E type. As the result of the comparison, A type has 13 processes that is the maximum number of processes (see FIG. 3). The tailgate line 9 is therefore arranged associated with the assembling processes of A type, and operators or workers are allocated to the respective processes. Since operations are different in the respective processes, each operational work is set in accordance with the type. In the tailgate line 9, all the tailgate assemblies equipped in A type through E type can be assembled.

In the case of (1), man-hour deviations due to differences of the types are absorbed in the rear door line 8 by the process arrangement, which ensures assembly of a special left rear door of D type or assembly of a slide door assembly of E type. In other words, man-hour deviations are decreased in such a manner that the excess man-hours of FIG. 7, which are illustrated by the hatching line in the column indicating "SUB-LINE", are utilized as man-hours for assembling a left rear door or a slide door assembly. In the process arrangement of (1), since operators are allocated to all the processes distributed into the front door line 7, the rear door line 8 and the tailgate line 9, operators do not move to other processes according to the types.

The instance (2) where the tailgate is removed only in D type and E type will be described.

Unlike (1), in the instance (2), operators or workers are not specially allocated to the processes arranged in the tailgate line 9. This is because the number of processes (man-hours) in the main lines 2, 3, 4, 5 and 6 is different due to differences of the types as illustrated in FIG. 4. Especially in the automobile assembly system 1, the number of processes is small in A, B and C types. And the process arrangement in the main lines 2, 3, 4, 5 and 6 of the automobile assembly system 1 is carried out in accordance with E type with the maximum number of processes, and operators or workers are allocated to the respective processes. For this reason, when assembling A, B and C types, excess operators occur in a large number of processes of the main lines 2, 3, 4, 5 and 6. Therefore, when assembling A, B and C types, a tailgate assembly is assembled in any of the assembling lines (main lines) 2, 3, 4 and 5 with the use of the excess operators (excess man-hours) and without removing the tailgate.

D type and E type do not have a right rear door or a right slide door. Therefore, there is no need to assemble a right rear door assembly or a right slide door assembly in the rear door line 8. For this reason, excess operators occur in a large number of processes of the rear door line 8 when assembling a rear door assembly of D type and E type. According to this embodiment, with the use of the resulting excess operators (man-hours), a tailgate assembly of D type and E type is assembled in the tailgate line 9.

Since the process arrangement of the front door line 7 is carried out substantially in the same process arrangement of (1), explanation thereof will be omitted.

In the process arrangement of the rear door line 8, comparison is made between each number of processes for assembling both right and left rear door assemblies of A type through C type and each number of processes for assembling a left rear door assembly (or a slide door assembly) and a tailgate assembly of D type and E type. Incidentally, the reason why only D type and E type consider the number of processes for assembling a tailgate assembly is that operators are not specially allocated to each process of the tailgate line 9 and the operators in the rear door line 8 are utilized for the tailgate line 9, and a tailgate assembly of A type through C type is assembled in any of the assembling lines (main lines) 2, 3, 4 and 5. As the result of the comparison, D type and E type have the total of 22 processes for assembling a rear door assembly (or a slide door assembly) and a tailgate assembly, that is the maximum number of processes (see FIG. 3). Incidentally, the rear door line 8 is therefore arranged associated with the assembling processes of D type and E type, and operators or workers are allocated to the respective processes. Further, since operations are different in the respective processes, each operational work is set in accordance with the type. Therefore, in the rear door line 8, all the right and left rear door assemblies or the slide door assembly equipped in A through E type can be assembled.

In the process arrangement of the tailgate line 9, comparison is made for each number of processes for assembling a tailgate assembly of D type and E type, because a tailgate assembly of A type through C type is assembled in any of the assembling lines (main lines) 2, 3, 4 and 5. As the result of the comparison, E type has 12 processes that is the maximum number of processes (see FIG. 3). The tailgate line 9 is therefore arranged associated with the assembling processes of E type, however operators or workers are not allocated to the respective processes. This is because excess operators in the rear door line 8 carry out the operations in the tailgate line 9. Further, since operations are different in the respective processes, each operational work is set in accordance with the type. In the tailgate line 9, all the tailgate assemblies equipped in D type and E type can be assembled.

In the case of (2), as to A type through C type, a tailgate assembly is assembled with the use of the excess man-hours (excess operators) due to differences of the type in the main lines 2, 3, 4, 5 and 6. And as to D type and E type, a tailgate assembly is assembled with the use of the excess man-hours (excess operators) due to differences of the type in the rear door line 8. Therefore, when compared with (1), man-hour deviations due to differences of the types can be absorbed further.

According to this automobile assembly system 1, since the slide door assembly and the like can be assembled in the rear door line 8 and there is no need to assemble the slide door assembly and the like in the main line, the man-hour deviations at the rear door line 8 are decreased. For this reason, man-hour deviations due to differences of the types can be absorbed in the automobile assembly system 1. Further, since the tailgate assembly is assembled in the automobile assembly system 1 with the use of the excess operators in the main lines 2, 3, 4, 5 and 6 or in the rear door line 8 due to differences of the types, the number of the excess operators in the main line 2, 3, 4, 5 and 6 or in the rear door line 8 decreases and there is no need to allocate operators specially to the tailgate line 9. Therefore, man-hour deviations due to differences of the types can be absorbed further in the automobile assembly system 1. As a result, man-hour deviations can be absorbed in a whole system and the assembling efficiency is improved.

Further, according to this automobile assembly system 1, since the tailgate line 9 is arranged as a sub-line, the length of the main line becomes shorter for the processes required for assembling the tailgate assembly. Further, according to this automobile assembly system 1, since the slide door assembly and the like are assembled in the rear door line 8, the length of the main line becomes shorter for the processes required for assembling the slide door assembly and the like.

Moreover, according to this automobile assembly system 1, since the tailgate or the slide door is removed from the vehicle body and is assembled with various parts, workability is improved remarkably in comparison with the conventional assembling operations. For example, since the tailgate is assembled to the vehicle body in the conventional assembling operations with respect to the tailgate, workability is poor due to the reasons, such as overhead position operations are increased, pitch or roll occurs at the fixing operation and the like because the tailgate is pivotally rotated, the opening and closing of the tailgate is laboring and heavy, and the line of flow to the tailgate becomes long. Further, in the conventional assembling operations, since the tailgate must be frequently open upon assembling parts to the tailgate or upon assembling interior parts to the vehicle body, care should be taken to ensure security for other operators. However, according to this automobile assembly system 1, since operations can be carried out while the tailgate itself is fixed, the drawbacks of the conventional assembling operations can be eliminated, leading to decreased workload of the operators.

With reference to flow charts of FIGS. 5 and 6, the automobile assembling method utilizing the automobile assembly system 1 will be described. Especially, method of assembling a front door, a rear door (or a slide door) and a tailgate will be described for instances, where the tailgate is removed in all of the five types and where the tailgate is removed only in D type and E type among the five types. Reference is made to FIGS. 1 and 2 associated with the description. Since FIGS. 5 and 6 illustrate all the assembling processes of the five types, explanation will be made accordingly.

All the conveyors of the automobile assembly system 1 are separately controlled with a control device, to which is inputted various kinds of information with respect to the vehicle body F to be carried, such as car models, types, width and length of the automobile, through an ID card and the like. Further, the automobile assembly system 1 is also controlled with a control apparatus which controls the whole system, and this control apparatus further controls the control devices of the respective conveyors such that assembly in the front door line 7 and the like is synchronized with assembly in the assembling lines (main lines) 2, 3, 4 and 5. Further, since the automobile assembly system 1 is required to vary the operation of each operator in accordance with the types or to move the operators to other lines, an indicating device and the like are provided for indicating information of the type presently transferred on the line or information of the type subsequently transferred on the line.

First, with reference to FIG. 5, explanation will be made to the instance where the tailgate is removed in all the types.

In the automobile assembly system 1, a vehicle body F transferred from a painting system (not shown) is carried on the friction conveyor FC1 via the overhead conveyor OC1. And, in the automobile assembly system 1, with regard to all the five types, a tailgate is removed from a vehicle body F at the tailgate-removing process TRP in the friction conveyor FC1 (S10). And, in the automobile assembly system 1, the removed tailgate is carried with the overhead conveyor OC8 to the tailgate receiving position 94 in the tailgate line 9.

Next, in the automobile assembly system 1, in the case of A type, both right and left front doors and both right and left rear doors are removed from the vehicle body F at the door-removing process DRP in the friction conveyor FC1 (S20A). And, in the automobile assembly system 1, in the case of B type, both right and left front doors are removed from the vehicle body F at the door-removing process DRP (S20B). And, in the automobile assembly system 1, in the case of C type, both right and left front doors and both right and left rear doors are removed from the vehicle body F at the door-removing process DRP (S20C). And, in the automobile assembly system 1, in the case of D type, both right and left front doors and a left rear door are removed from the vehicle body F at the door-removing process DRP (S20D). And, in the automobile assembly system 1, in the case of E type, both right and left front doors and a left slide door are removed from the vehicle body F at the door-removing process DRP (S20E). According to the automobile assembly system 1, the thus removed front doors are carried with the overhead conveyor OC4 to the front door receiving position 74 in the front door line 7. Further, in the automobile assembly system 1, the removed rear doors (or the slide door) are carried with the overhead conveyor OC6 to the rear door receiving position 84 in the rear door line 8.

After removing the doors, the automobile assembly system 1 is divided into the assembly in the main line with respect to the vehicle body F from which the front doors and the like are removed and the assembly in the sub-lines with respect to the front doors and the like.

In other words, in the automobile assembly system 1, with respect to all the five types, various main parts are assembled to the vehicle body F in the assembling lines (main lines) 2, 3, 4 and 5 (S30). Of course, main parts to be assembled are different according to the types and therefore the assembling processes also differ. In the automobile assembly system 1, the vehicle body F to which various main parts have been assembled, is carried to the tailgate-fixing process TFP on the friction conveyor FC5.

During the assembly in the main line, with respect to all the five types, various subparts are assembled to the right front door and the left front door in the front door line 7 to thereby assemble the front door assembly (S31). Of course, main parts to be assembled are different according to the types and therefore the assembling processes also differ. In the automobile assembly system 1, the resulting front door assembly is carried with the overhead conveyor OC5 from the front door assembly transferring position 75 to the door-fixing process DFP on the friction conveyor FC5.

In this embodiment, S31 refers to the front door assembling step defined in the claims.

Further, with respect to A type, C type and D type, various subparts are assembled to both right and left rear door (or merely a left rear door) in the rear door line 8 to thereby assemble the rear door assembly (S32). And with respect to E type, various subparts are assembled to the left slide door in the rear door line 8 to thereby assembly the slide door assembly (S33). Of course, main parts to be assembled are different according to the types and therefore the assembling processes also differ. In the automobile assembly system 1, the resulting rear door assembly or the slide door assembly is carried with the overhead conveyor OC7 from the rear door assembly transferring position 85 to the door-fixing process DFP on the friction conveyor FC5.

In this embodiment, S32 and S33 refer to as the rear door assembling step defined in the claims.

Further, in the automobile assembly system 1, with respect to all of the five types, various subparts are assembled to the tailgate in the tailgate line 9 to thereby assemble the tailgate assembly (S34). Of course, subparts to be assembled are different according to the types and therefore the assembling processes also differ. And, in the automobile assembly system 1, the resulting tailgate assembly is carried with the overhead conveyor OC9 from the tailgate assembly transferring position 95 to the tailgate-fixing process TFP on the friction conveyor FC5.

Further, in this embodiment, S34 refers to the tailgate assembling step defined in the claims.

Subsequently, with respect to all the five types, the tailgate assembly is attached to the vehicle body F in the tailgate-fixing process TFP (S40). In the automobile assembly system 1, the timing at which the vehicle body F is transferred to the tailgate-fixing process TFP is synchronized with the timing at which the assembled tailgate assembly is transferred to the tailgate-fixing process TFP.

In this embodiment, S40 refers to the tailgate assembling step defined in the claims.

Next, in the case of A type, both right and left front door assemblies and both right and left rear door assemblies are attached to the vehicle body F in the door-fixing process DFP on the friction conveyor FC5 (S50A). In the case of B type, both right and left front door assemblies are attached to the vehicle body F in the door-fixing process DFP (S50B). And in the case of C type, both right and left front door assemblies and both right and left rear door assemblies are attached to the vehicle body F in the door-fixing process DFP (S50C). And in the case of D type, both right and left front door assemblies and the left rear door assembly are attached to the vehicle body F in the door-fixing process DFP (S50D). And in the case of E type, both right and left front door assemblies and the left slide door assembly are attached to the vehicle body F in the door-fixing process DFP (S50E). In the automobile assembly system 1, the timing at which the vehicle body F is transferred to the door-fixing process DFP is synchronized with the timing at which the assembled front door assembly and rear door assembly (or the slide door assembly) are transferred to the door-fixing process DFP.

In this embodiment, S50A, S50B, S50C, S50D or S50E refers to the door fixing step defined in the claims.

Finally, after completing all the assembly with respect to the vehicle body F, the vehicle body F is inspected to guarantee the quality thereof in the combination zone CZ, and thereafter the vehicle body F is transferred to the subsequent system.

Then, with reference to FIG. 6, explanation will be made to the instance where the tailgate is removed only in D type and E type among five types, in which processes similar to those previously described with reference to FIG. 5 are denoted by the same reference numerals and detailed description thereof will be omitted.

In the automobile assembly system 1, a vehicle body F transferred from a painting system (not shown) is carried on the friction conveyor FC1 via the overhead conveyor OC1. In the automobile assembly system 1, with regard to D type and E type, a tailgate is removed from a vehicle body F at the tailgate-removing process TRP in the friction conveyor FC1 (S60). And the removed tailgate is carried with the overhead conveyor OC8 to the tailgate receiving position 94 in the tailgate line 9. A vehicle body F of A type through C type is carried to the subsequent process with the tailgate attached to the vehicle body F.

Next, both front doors and rear doors (or a slide door) are removed from the vehicle body F (S20A, S20B, S20C, S20D and S20E). And the automobile assembly system 1 is divided into the assembly in the main line with respect to the vehicle body F from which the front doors and the like are removed and the assembly in the sub-lines with respect to the front doors and the like.

In other words, in the automobile assembly system 1, with respect to all the five types, various main parts are assembled to the vehicle body F in the assembling lines (main lines) 2, 3, 4 and 5 (S70). Of course, main parts to be assembled are different according to the types and therefore the assembling processes also differ. In the automobile assembly system 1, with respect to A type through C type, various parts are assembled to the tailgate in the assembling lines (main lines) 2, 3, 4 and 5 to thereby assemble the tailgate assembly (S71). Which assembling line 2, 3,4 and 5 is used for assembling parts to the tailgate depends on the type. That is, main parts to be assembled are different according to the types and therefore the assembling processes also differ. For this reason, the processes in which the operation is not carried out in the assembling lines 2, 3, 4 and 5 differ according to the types and there are differences in the area where excess operators arise. In the automobile assembly system 1, the process for assembling the tailgate is incorporated in the area where excess operators arise. Further, in the automobile assembly system 1, the processes are incorporated in the area for example with excellent workability upon assembling parts to the tailgate, and the excess operators are moved to this area to carry out the assembling operations. In the automobile assembly system 1, the vehicle body F to which various main parts are attached is carried to the tailgate-fixing process TFP on the friction conveyor FC5.

During the assembly in the main line, with respect to all the five types, the front door assembly is assembled in the front door line 7 (S31), and the resulting front door assembly is carried to the door-fixing process DFP on the friction conveyor FC5. Further, in the rear door line 8, the rear door assembly is assembled with respect to A type, C type and D type (S32) and the slide door assembly is assembled with respect to E type (S33). In the automobile assembly system 1, the resulting rear door assembly or the slide door assembly is carried to the door-fixing process DFP on the friction conveyor FC5.

Further, in the automobile assembly system, with respect to D type and E type, various subparts are assembled to the tailgate in the tailgate line 9 to thereby assemble the tailgate assembly (S72). Of course, subparts to be assembled are different according to the types and therefore the assembling processes also differ. As to the assembly in the tailgate line 9, the excess operators in the assembling lines (main lines) 2, 3, 4 and 5 move to the tailgate line 9 and carry out the assembling operation. According to the automobile assembly system 1, the resulting tailgate assembly is carried with the overhead conveyor OC9 from the tailgate assembly transferring position 95 to the tailgate-fixing process TFP on the friction conveyor FC5.

In this embodiment, S72 refers to the tailgate assembling step defined in the claims.

Subsequently, with respect to D type and E type, the tailgate assembly is attached to the vehicle body F in the tailgate-fixing process TFP(S80). In the automobile assembly system 1, with respect to D type and E type, the timing at which the vehicle body F is transferred to the tailgate-fixing process TFP is synchronized with the timing at which the assembled tailgate assembly is transferred to the tailgate-fixing process TFP.

In this embodiment, S80 refers to the tailgate assembling step defined in the claims.

Next, the front door assemblies and the rear door assemblies (or the slide door assembly) are attached to the vehicle body F (S50A, S50B, S50C, S50D and S50E). In the automobile assembly system 1, the timing at which the vehicle body F is transferred to the door-fixing process DFP is synchronized with the timing at which the assembled front door assembly and rear door assembly (or the slide door assembly) are transferred to the door-fixing process DFP.

Finally, after completing all the assembly with respect to the vehicle body F, the vehicle body F is inspected to guarantee the quality thereof in the combination zone CZ, and thereafter the vehicle body F is transferred to the subsequent system.

According to the automobile assembly method, since all kinds of door assemblies attached to the rear side of the vehicle body F are assembled in the rear door line 8, man-hour deviations in the main line can be decreased and the man-hour deviations for assembling the door to be attached to the rear side can be decreased. Further, since the tailgate assembly is assembled with the use of the excess operators in the main lines 2, 3, 4, 5 and 6 or the rear door line 8 due to differences of the types, man-hour deviations due to differences of the types can be decreased. As a result, according to the automobile assembly method, man-hour deviations can be absorbed in a whole system and the assembling efficiency is improved.

While the invention has been described in detail with reference to specific embodiments thereof, it will be apparent to one skilled in the art that various changes and modifications can be made therein without departing from the spirit and scope thereof.

For example, although the automobile assembly system 1 is described with respect to the instances assembling A type through E type, the automobile assembly system 1 is applicable to other types. In this event, the process arrangement is carried out based on all the types to be applied.

Further, in the illustrated embodiment, the tailgate line 9 is provided in an instance where the tailgate is removed only in D type and E type among five types, and the assembly is assembled in the tailgate line 9. However, the tailgate line 9 may not be provided if the tailgate assembly can be assembled in the rear door line 8.

INDUSTRIAL APPLICABILITY

According to one aspect of the automobile assembly system of the present invention, since slide door assemblies other than rear door assemblies can be assembled in the rear door sub-line, it is not necessary to assemble slide door assemblies in the main line. For this reason, in the automobile assembly system, the length of the main line can be reduced and decreased space requirement of the whole system can be achieved. Further, in the automobile assembly system, the man-hour deviations between the types equipped with a slide door or rear doors can be absorbed, leading to improved assembling efficiency.

According to another aspect of the automobile assembly system of the present invention, because of the provision of the tailgate sub-line, it is not necessary to assemble tailgates in the main line. Therefore, in the automobile assembly system, the length of the main line can be reduced and decreased space requirement of the whole system can be achieved further.

According to another aspect of the automobile assembly system of the present invention, since tailgate assemblies are assembled by way of utilizing man-hour deviations derived from differences of the types and arisen at the main line or at the sub-line, the man-hour deviations derived from differences of the types can be absorbed and therefore the assembling efficiency is further improved.

Further, according to one aspect of the automobile assembly method 4 of the present invention, since rear door assemblies or slide door assemblies are assembled in the rear door assembling step that is carried out in the same rear door sub-line, it is not necessary to assemble slide door assemblies in the main line. For this reason, in the automobile assembly method, the length of the main line can be reduced and decreased space requirement of the whole system can be achieved. Further, in the automobile assembly method, the man-hour deviations between the types equipped with a slide door or rear doors can be absorbed, leading to improved assembling efficiency.

According to another aspect of the automobile assembly method of the present invention, since tailgates are assembled in the tailgate-assembling step in the tailgate sub-line, it is not necessary to assemble tailgates in the main line. Therefore, the length of the main line can be reduced and decreased space requirement of the whole system can be achieved further.

According to another aspect of the automobile assembly method of the present invention, since tailgate assemblies are assembled by way of utilizing man-hour deviations derived from differences of the types and arisen at the main line or at the sub-line, the man-hour deviations derived from differences of the types can be absorbed and therefore the assembling efficiency is further improved.

What is claimed is:

1. An automobile assembly system for assembling plural types of automobiles, including a type equipped with front doors, rears doors, a slide door a tailgate, comprising:

a main line configured to receive, on an upstream section of the main line, a vehicle body having attached thereto front doors and at least one of a rear door, a slide door and a tailgate;

a front door sub-line for assembling front door assemblies, wherein said front door sub-line is configured to receive front doors that have been removed from the vehicle body disposed on the main line, and wherein said front door sub-line is configured for assembly of subparts to the front door to create the front door assemblies; and a rear door sub-line for assembling at least one of rear door assemblies and slide door assemblies, wherein said rear door sub-line is configured to receive at least one of the rear door and the slide door that have been removed from the vehicle body disposed on the main line, and wherein said rear door sub-line is configured for assembly of subparts to at least one of the rear door and slide door to create the rear door assemblies, wherein the main line is further configured to assemble said front door assemblies with a vehicle body and to assemble said rear door assemblies or said slide door assemblies with a vehicle body.

2. An automobile assembly system according to claim 1, wherein the automobile assembly system further comprises a tailgate sub-line for assembling tailgate assemblies, wherein said tailgate sub-line is configured to receive a tailgate that has been removed from the vehicle body disposed on the main line, wherein said tailgate sub-line is configured for assembly of subparts to the tailgate to create a tailgate assembly, and wherein said tailgate assembly is assembled with a vehicle body in the main line.

3. An automobile assembly system according to claim 2, wherein excess man-hours at the main line or at the rear door sub-line are distributed to man-hours required for assembling said tailgate assemblies.

4. The automobile assembly system according to claim 1, wherein the main line receives the vehicle body transferred from a painting system prior to assembling the front door assemblies with the vehicle body and prior to assembling the rear door assemblies and the slide door assemblies with the vehicle body.

5. The automobile assembly system according to claim 1, wherein excess man-hours at the main line or at the rear door sub-line are distributed to man-hours required for assembling tailgate assemblies.

6. A method of assembling plural types of automobiles, including a type equipped with front doors, rear doors, a slide door a tailgate, comprising:

removing at least one of the front doors, rear doors, slide door and tailgate from a vehicle body disposed on an upstream side of a mainline;

assembling front door assemblies in a front door sub-line;

assembling at least one of rear door assemblies and slide door assemblies in a rear door sub-line in the case of a type of automobile equipped with a rear door or a slide door; and assembling said front door assemblies with the vehicle body in the main line, and in the case of a type of automobile equipped with a rear door or a slide door, assembling said rear door assembly or said slide door assembly with a vehicle body in the main line.

7. A method of assembling plural types of automobiles according to claim 6, wherein in the case of a type equipped with a tailgate, the method further comprising:

assembling tailgate assemblies in a tailgate sub-line; and assembling said tailgate assembly with a vehicle body in the main line.

8. A method of assembling plural types of automobiles according to claim 7, wherein excess man-hours at the main line or at the rear door sub-line are distributed to man-hours required for assembling said tailgate assemblies.

9. The method of assembling plural types of automobiles according to claim 6, wherein the main line receives the vehicle body transferred from a painting system prior to assembling the front and rear door assemblies.

10. A method of assembling plural types of automobiles according to claim 6, wherein excess man-hours at the main line or at the rear door sub-line are distributed to man-hours required for assembling tailgate assemblies.

11. An automobile assembly system for assembling plural types of automobiles including a type equipped with a slide door or a tailgate, comprising:

a main line configured to receive on an upstream section of the main line an automobile body having attached front doors and at least one of a rear door, a slide door and a tailgate;

a front door sub-line that receives a front door removed from each automobile body in the system having a front door, and which assembles subparts to the front door to complete a front door assembly;

rear door sub-line that receives a rear door removed from each automobile body in the system having a rear door, and which assembles subparts to the rear door to complete a rear door assembly; the rear door sub-line further receives a slide door removed from each automobile body in the system having a slide door, and further assembles subparts to the slide door to complete a slide door assembly; and wherein the main line attaches the front door assembly, the rear door assembly, and the slide door assembly to the automobile body.

12. The automobile assembly system according to claim 11, wherein the automobile assembly system further comprises a tailgate sub-line that receives a tailgate removed from each automobile body in the system having a tailgate, and which assembles subparts to the tailgate to complete a tailgate assembly; and wherein the tailgate assembly is attached to the automobile body in the main line.

13. The automobile assembly system according to claim 12, wherein excess man-hours at the main line or at the rear door sub-line are distributed to man-hours required for assembling the tailgate assemblies.

14. The automobile assembly system according to claim 12, wherein each of the sub-lines is configured to handle the maximum number of process steps necessary to carry out the respective front, rear, slide, and tailgate assemblies for each type of automobile in the assembly system.

15. The automobile assembly system according to claim 14, wherein the main line receives the automobile body transferred from a painting system prior to assembling the tailgate assemblies.

16. The automobile assembly system according to claim 11, wherein the main line receives the automobile body transferred from a painting system prior to assembling the front door, rear door, and slide door assemblies.

17. The automobile assembly system according to claim 11, wherein the automobile body is conveyed along the entire main line.

18. The automobile assembly system according to claim 17, wherein the main line includes a pre-wiring zone where electric wires of the automobile are integrated and assembled to a automobile body.

19. The automobile assembly system according to claim 18, wherein the main line includes an interior setting zone where interior floor parts of the automobile are integrated and assembled to the automobile body.

20. The automobile assembly system according to claim 19, wherein the main line includes an underbody setting zone where underbody parts of the automobile are integrated and assembled to a automobile body, including suspensions, an engine, and tires.

21. The automobile assembly system according to claim 20, wherein the main line includes a combination zone where inspection of the function is carried out for various equipment assembled to the automobile body, including the automobile lights and wire connections for the battery and electrical terminals.

22. The automobile assembly system according to claim 11, wherein the front door sub-line and the rear door sub-line have separate conveyor systems from the main line.

23. An automobile assembly system for assembling plural types of automobiles including a type equipped with a slide door or a tailgate, comprising:

a front door sub-line that receives a front door removed from each automobile body in the system having a front door, and which assembles subparts to the front door to complete a front door assembly;

rear door sub-line that receives a rear door removed from each automobile body in the system having a rear door, and which assembles subparts to the rear door to complete a rear door assembly; the rear door sub-line further receives a slide door removed from each automobile body in the system having a slide door, and further assembles subparts to the slide door to complete a slide door assembly; and a main line that attaches the front door assembly, the rear door assembly, and the slide door assembly to the automobile body, wherein the automobile assembly system further comprises a tailgate sub-line that receives a tailgate removed from each automobile body in the system having a tailgate, and which assembles subparts to the tailgate to complete a tailgate assembly; and wherein the tailgate assembly is attached to the automobile body in the main line, wherein each of the sub-lines is configured to handle the maximum number of process steps necessary to carry out the respective front, rear, slide, and tailgate assemblies for each type of automobile in the assembly system, and wherein the main line receives the automobile body transferred from a painting system prior to assembling the tailgate assemblies.

24. An automobile assembly system for assembling plural types of automobiles including a type equipped with a slide door or a tailgate, comprising:

a front door sub-line that receives a front door removed from each automobile body in the system having a front door, and which assembles subparts to the front door to complete a front door assembly:

rear door sub-line that receives a rear door removed from each automobile body in the system having a rear door, and which assembles subparts to the rear door to complete a rear door assembly; the rear door sub-line further receives a slide door removed from each automobile body in the system having a slide door, and further assembles subparts to the slide door to complete a slide door assembly; and a main line that attaches front door assembly, the rear door assembly, and the slide door assembly to the automobile body, wherein the front door sub-line and the rear door sub-line have separate conveyor systems from the main line.

25. A method of assembling plural types of automobiles including a type equipped with a slide door or a tailgate, comprising:

receiving on an upstream section of a main line an automobile having attached front doors and at least one of a rear door, a slide door and a tailgate;

removing the front door from the automobile body and conveying the front door to a separate front door sub-line;

assembling subparts to the front door to complete a front door assembly;

for an automobile having a rear door, removing the rear door from the automobile body and conveying the rear door to a separate rear door sub-line;

assembling subparts to the rear door to complete a rear door assembly;

for an automobile having a slide door, removing the slide door from the automobile body and conveying the slide door to i:he rear door sub-line;

assembling subparts to the slide door to complete a slide door assembly; and reattaching on one or more downstream sections of the main line the front door assembly; the rear door assembly, for an automobile having a rear door; and the slide door assembly, for an automobile having a slide door.

26. The method according to claim 25, further comprising, for an automobile having a tailgate, removing the tailgate from the automobile body and conveying the tailgate to a tailgate sub-line; assembling subparts to the tailgate to complete a tailgate assembly; and reattaching on a downstream section of the main line the tailgate assembly.

27. The method according to claim 26, wherein the main line receives the automobile body transferred from a painting system prior to the front and rear door assembling steps.

28. The method according to claim 25, wherein the main line receives the automobile body transferred from a painting system prior to the front and rear door assembling steps.

29. An automobile assembly system for assembling plural types of automobiles including a type equipped with a tailgate, comprising:

a main line configured to receive on an upstream section of the main line an automobile body having attached front doors and at least one of a rear door, a slide door and a tailgate;

a front door sub-line that receives a front door removed from each automobile body in the system having a front door, and which assembles subparts to the front door to complete a front door assembly;

rear door sub-line that receives a rear door removed from each automobile body in the system having a rear door, and which assembles subparts to the rear door to complete a rear door assembly;

a tailgate sub-line that receives a tailgate removed from each automobile body in the system having a tailgate, and which assembles subparts to the tailgate to complete a tailgate assembly; and wherein the main line attaches the front door assembly, the rear door assembly, and the tailgate assembly to the automobile body.

* * * * *